Jan. 11, 1955  G. V. W. ROTH ET AL  2,699,536
COMBINATION SIGNAL HEADLIGHT
Filed June 22, 1950
3 Sheets-Sheet 1
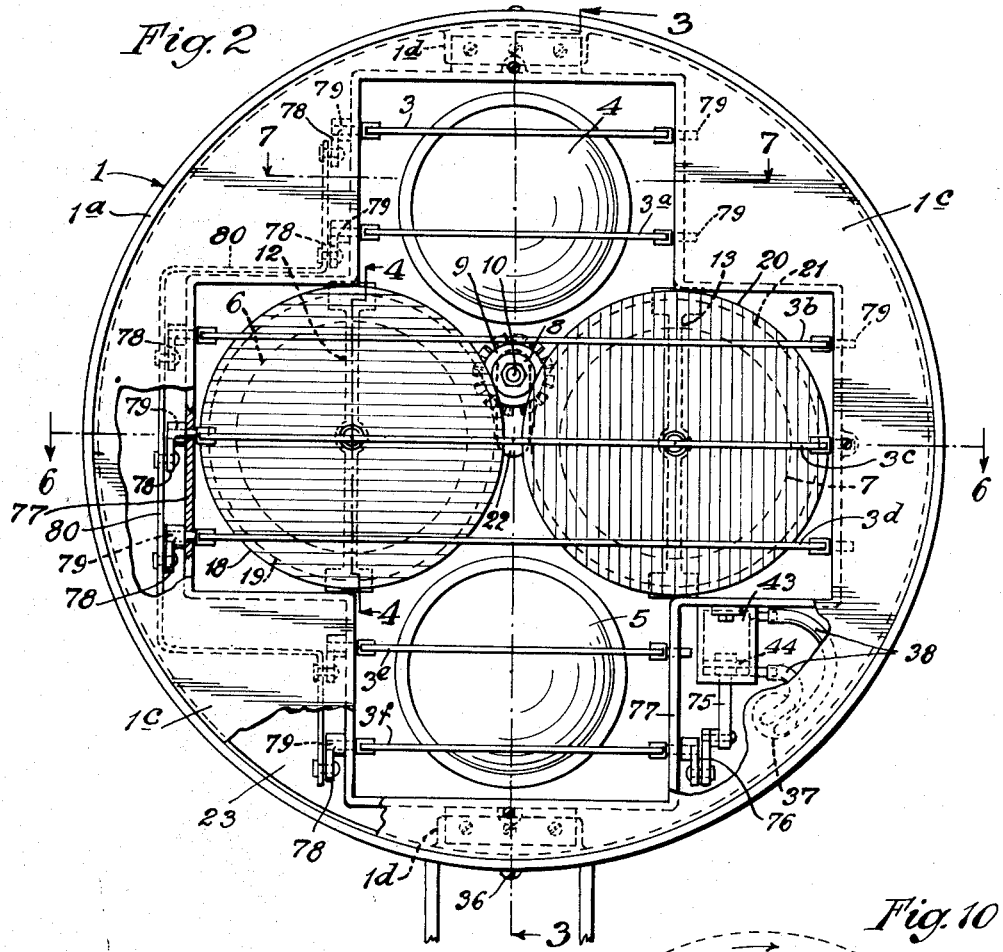
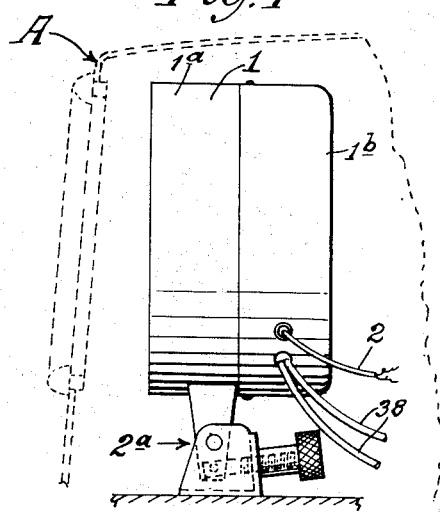
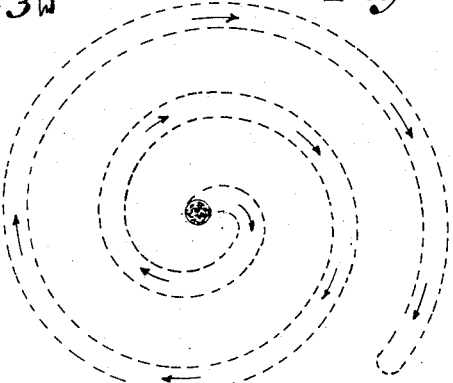
Inventors
Grant V. W. Roth
Lester V. Walsh
by Parker & Carter
Attorneys Jan. 11, 1955  G. V. W. ROTH ET AL  2,699,536
COMBINATION SIGNAL HEADLIGHT
Filed June 22, 1950  3 Sheets-Sheet 2
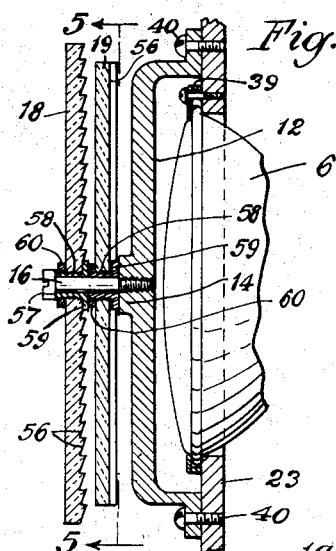
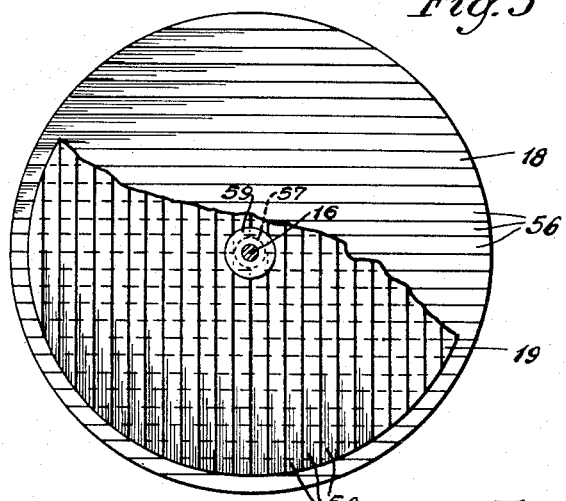
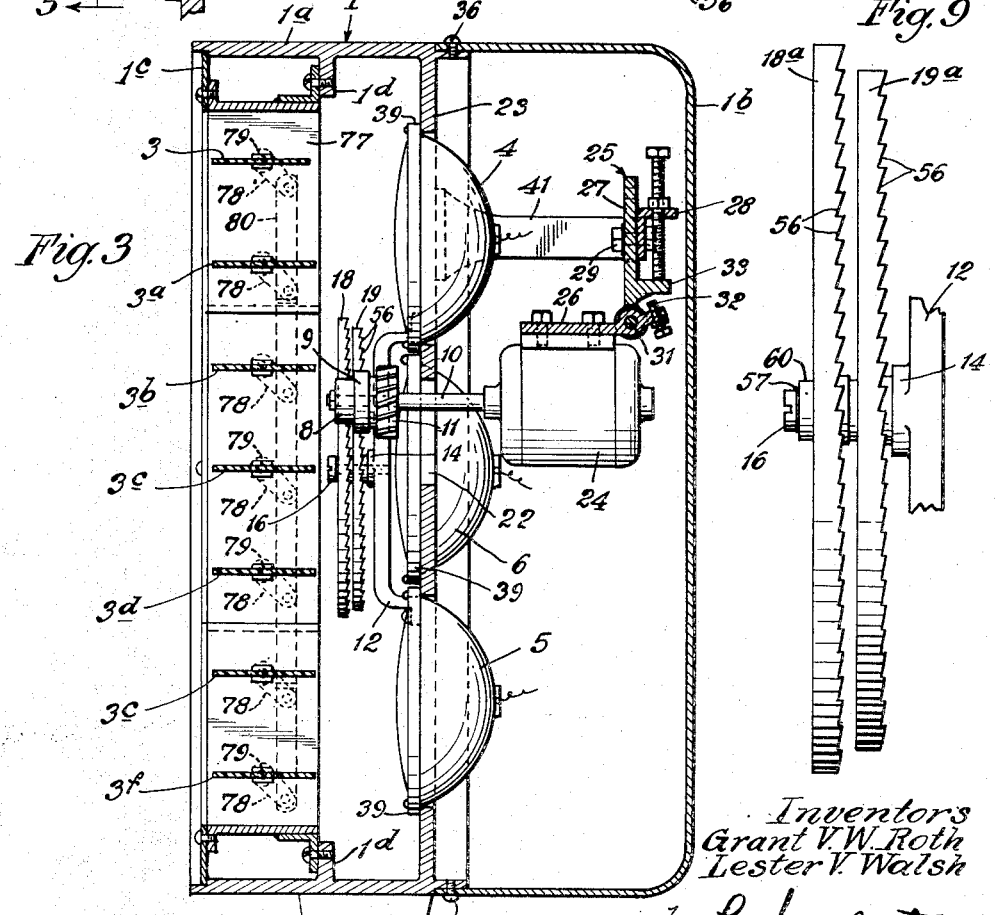
Inventors
Grant V. W. Roth
Lester V. Walsh
by Parker & Carter
Attorneys Jan. 11, 1955
G. V. W. ROTH ET AL
2,699,536
COMBINATION SIGNAL HEADLIGHT
Filed June 22, 1950
3 Sheets-Sheet 3
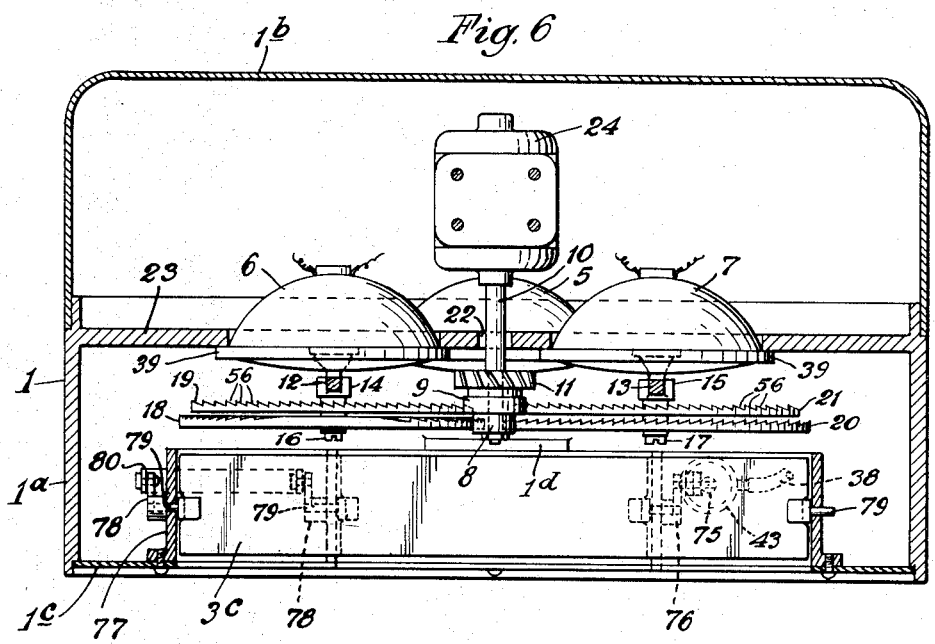
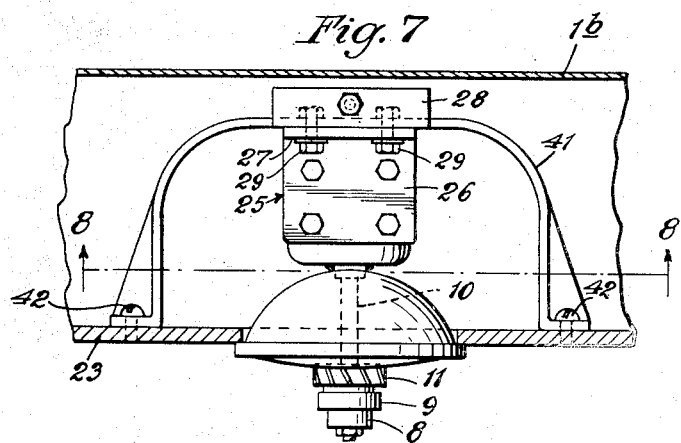
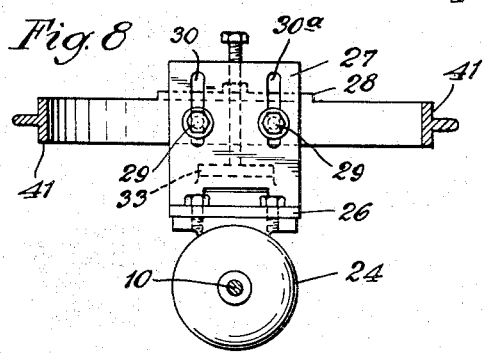
Inventors
Grant V. W. Roth
Lester V. Walsh
by Parker & Carter
Attorneys

United States Patent Office 2,699,536
Patented Jan. 11, 1955

2,699,536

COMBINATION SIGNAL HEADLIGHT

Grant V. W. Roth, Evanston, and Lester V. Walsh, Chicago, Ill.

Application June 22, 1950, Serial No. 169,572

7 Claims. (Cl. 340—49)

Our invention relates to headlights and warning signal lights, and to combinations thereof, and more particularly to signal lights which include controlled movable light beams projected a substantial distance from the light source and providing an intermittent lighting effect as a warning signal to persons positioned within the periphery of the beams.

In the art of vehicle signaling, moving signal light beams have been produced in the past through a mechanism for manipulating the light source itself or the reflector. Such mechanism is relatively complicated, expensive and difficult to maintain and adjust. Vehicles, such as locomotives, have a limited space available in which to place lights. In the past, in order to satisfy the great need for an effective warning signal such warning lights were attached separately to the front of the locomotive in order that the vehicle be provided with both a steady forward headlight for illumination of the area ahead and also with a light adapted to attract and hold the attention of those who should be warned of the approach of the vehicle. It is very desirable also that a plurality of each type of light be provided to assure safety in the event that one of each light becomes inoperative. The advent of the "sealed-beam" light source made it possible to include a plurality of headlights within the limited space available. It is accordingly a primary object of our invention to provide a simple, lightweight and compact mechanism which may fit within a standard headlight housing and which includes a lens rotated in front of a light source in the housing to produce the rotation of the beam while the light source itself remains fixed. It is equally important in the art to provide a moving light beam which will adequately cover a wide area with rapidly repeating warning signals. Prior lights have been unsatisfactory in the sense that the movable beam left a wide area unlighted and the warning signal in any particular area too infrequent. The rotation of our lenses produces a spiralling action in the light beam wherein the point of concentration of the light beam, beginning at a point directly forward of the center of the light source, describes as it moves a widening outward spiral until a predetermined point is reached at which time the action is repeated.

Another object of the present invention is to provide a warning signal lamp which will be simple in design, reliable in operation and economical in manufacture.

Another object of our invention is to provide a signal lamp capable of creating a moving light beam, the light source whereof remains fixed, thus enabling great simplicity of construction, little likelihood of maladjustment and little need of realignment.

Another object of our invention is to provide for vehicles a light which will include in combination one or more fixed beams of light and one or more moving beams of light.

Another object of our invention is to provide a light which will perform the functions of illumination and warning.

Another object of our invention is to provide a method of creating movable light beams from a plurality of light sources with a single source of motive power.

Another object of our invention is to provide a mechanism for creating movable light beams which is self-adjusting.

Another object of our invention is to provide a method of automatically changing the color of light beams, emanating from a particular source, upon the occurrence of an emergency.

Other objects will appear from time to time in the course of the specification and claims.

We illustrate our invention more or less diagrammatically in the accompanying drawings wherein:

Figure 1 is a side view;
Figure 2 is a front view;
Figure 3 is a cross section on the line 3—3 of Figure 2;
Figure 4 is a cross section on the line 4—4 of Figure 2;
Figure 5 is a cross section on the line 5—5 of Figure 4;
Figure 6 is a cross section on the line 6—6 of Figure 2;
Figure 7 is a cross section on the line 7—7 of Figure 2;
Figure 8 is a cross section on the line 8—8 of Figure 7;
Figure 9 is a side view of a modified form of the lens elements forming a part of our invention; and
Figure 10 is a diagrammatic view illustrating the path traversed by a beam of light in accordance with our invention.

Like parts are indicated by like characters throughout the specification and drawings.

In the prefered embodiment of our invention shown in the drawings a light housing is shown with a vertical wall in which are set four light sources of the "sealed beam" variety, before two of which are rotatably and concentrically mounted a set of circular lenses having their outer circumferential edges coming close enough at one point to be in rolling contact with the single roller on the shaft between them which extends through a central slot in the wall to the motor mounted on the other side of the wall from the lenses and the open face of the housing is provided with transparent red shutters which are turned perpendicular to the light beams emanating from the housing upon the action of a piston connected to them, upon the occurrence of an emergency.

Referring to the drawings, Figure 1 shows a side view of applicants' structure indicated as being mounted in a standard locomotive housing or the like generally indicated as A. 1 indicates a lamp housing having an open face. Indicated at 2 is any suitable wiring to said housing to provide power for creating light beams, for providing motion to some of those light beams and for operation of a color changing mechanism, when electrical operation of said mechanism is desired. Generally indicated at 2a is an adjustable mounting for the housing 1, details of which do not form part of this invention and which will not therefore be further described. 3 indicates a shutter adapted to close a part of the open face of the housing 1. 3a, 3b, 3c, 3d, 3e and 3f are other shutters adapted in combination to close the remaining portions of the open face on the housing 1. Upon the occurrence of an emergency condition affecting the vehicle to which our light is attached, the shutters will be automatically turned, in a manner to be described below, to cover over the open face of the housing 1 and to thereby change the color of the light beams emanating therefrom, for example to a red color, to warn an approaching vehicle of the emergency. It will be understood that the number and positioning of the shutters may be changed without departing from the spirit of our invention. Light sources which may be of the "sealed-beam" variety are indicated at 4, 5, 6 and 7. 8 indicates a roller which may be of a pliable substance such as rubber. 9 indicates an enlarged annular area on the roller 8 and 10 indicates a motor shaft on which the roller 8 is mounted for rotation. Indicated at 11 is an impeller mounted for rotation on the shaft 10 behind roller 8—9. The impeller 11 is adapted to create a flow of air across the faces of the light sources 4, 5, 6 and 7 for the purpose of preventing too great a heat transfer from said light sources to elements in the path of the light beams emanating therefrom. It will be clear that if such elements are not affected by heat, the impeller may be removed with impunity; the provision of an impeller, however, permits a wider choice of materials for such elements. Across the faces of the light sources 6 and 7 are the brackets 12 and 13 respectively. At substantially the center of the brackets 12 and 13 are the internally threaded sleeves 14 and 15 into which are turned the bolts 16 and 17. Rotatably mounted on the bolt 16 are the lens elements 18 and 19 and rotatably mounted on the bolt 17 are the lens elements 20 and 21. As will be clear from Figure 6, the lens elements 18 and 20 are in frictional contact with and are turned by the single roller 8, and the lens elements 19 and 21 are in frictional contact with and are rotated by the enlarged portion 9 on the roller 8. The arrangement of parts is such, including the provision of lens members of different diameters and a roller having an enlarged portion in contact with the smaller lens member that a variation in the rotational speed of the two lens members before a single light source is produced. As will presently be described, this difference in rotational speed produces the desired spiral action in the light beam projected through the lenses.

As will be clear from Figure 3, the shaft 10 extends forwardly through an elongated slot opening 22 in the vertical wall 23, the purpose of the elongated slot being described below. Upon initial assembly of applicants' structure the roller 8—9 is set substantially above the horizontal center line of the light sources 6 and 7 and thereby contacts the lens elements 18—21 at a point substantially above the center line. The shaft 10 extends through the slot 22 near the top of said slot. The shaft 10 is rotated by the power source 24 which may be an electric motor. The motor 24 is rigidly fixed to one portion of the hinge element 25, said portion being indicated at 26. The other portion of the hinge element 25 generally indicated as 27 is attached to the bracket 28 by the bolts 29 which extend through the vertical slots 30 and 30a in the portion 27. It will be clear from Figure 3 that the hinge portion 27 is held in a generally vertical plane. Rigidly fixed to the hinge portion 26 on the opposite side of the hinge pivot 31 is the adjustable stop 32 adapted to contact the abutment 33 on the back portion of the hinge portion 27. As will be clear from Figure 3, the hinge portion 26, the motor 24, the shaft 10 and the roller 8—9 are initially maintained in a generally horizontal plane by the contact of the roller 8—9 with the lens elements 18—21. The resulting pressure of the roller 8—9 on the lens elements 18—21 is effective to maintain a continuous rolling contact and a driving connection between the shaft 10 and the lens elements 18—21. It will be clear that as the roller 8—9 becomes worn, the roller will fall lower in the area between the peripheries of the lens elements 18—21 and the shaft 10 will drop lower in the slot 22 and the hinge portion 26 will depend at a declining angle from the pivot 31. The adjustable stop 32 is effective to prevent a prohibitive downward inclination of the members 26, 24, 10 and the roller 8—9. When the adjustable stop 32 reaches a point of contact with the abutment 33, it is a simple matter for a mechanic to loosen the bolts 29 and to permit the hinge portion 27 to slide downwardly until the members 26, 24 and 10 are again in a substantially horizontal plane.

The housing 1 may be formed in a plurality of parts for purposes of easy access to the mechanism. As shown in Figure 3, the housing 1 may have a front portion 1a and a rear covering portion 1b fixed to the front portion as at 36 by any suitably removable connection. The front portion 1a may have a rear mounting wall 23 into which are cut apertures for each of the light sources 4, 5, 6 and 7 and the slot 22 for the shaft 10 and the aperture 37 for the wires or tubes 38 which will be discussed below. The light sources 4, 5, 6 and 7, after insertion rearwardly through the apertures provided in the wall 23 may be rigidly fixed to said wall by any suitable connection of a flange on the outer face of said light sources with said wall as at 39. The brackets 12 and 13 may be rigidly attached to the wall 23 by any suitable connection as at 40. The feet of the U-shaped bracket 41 may be attached to the rear face of the wall 23 as at 42 and the bracket 28 may be attached to the bracket 41 along the rear portion thereof.

Within the housing portion 1a may be located the cylinder 43 in which is slidably mounted the piston 44. It will be clear that the cylinder 43 and the piston 44 may be, as shown, a solenoid or it may be a pneumatic unit. Attached to the movable piston 44 is the rod 75 extending to the crank-arm 76 which is operatively connected ot the shutter 3f. The shutters 3, 3a, 3b, 3c, 3d, 3e and 3f are all pivotally mounted at the center of their endwise edges upon a shutter bracket 77, which is secured to the front wall 1c and to the projections 1d which extend inwardly from the housing portion 1a. The front wall 1c has an opening shaped to permit the light beams from the light sources 4, 5, 6 and 7 to project forward from the housing and the shutter bracket 77 is shaped to conform to the outer edges of said opening. Crank-arms 78 are attached to the pivot rods 79 which extend through one wall of the bracket 77 from the shutter to the crank-arm. The tie-rod 80 is pivotally connected to each crank-arm 78. It is clear that as the piston rod 75 moves it twists the shutter 3f which rotates the crank-arm 78 which is secured to the shutter 3f. The rotation of said crank-arm 78 causes the tie-rod 80 to move upwardly, thereby rotating each other crank-arm 78 and rotating each shutter on their pivot rods 79 to close the opening in the wall 1c and to impart to the light beams emanating therethrough to be colored, for example, red.

The lens elements 18 to 21 have their rear faces grooved as at 56. There may be integrally cast with the lens elements the center bearing elements 57; or as shown in Figure 4, the bearing element may be externally threaded as at 58 and may have a rear flange portion 59. The bearing element may be threaded into the lens element and the securing member 60 may be threaded upon that portion of the bearing element 57 which extends forwardly of the front face of the lens element. As will be clear from Figure 4, the securing member 60 on the rear bearing element may serve as a spacer between the lens elements.

As will be clear from Figures 4 and 5, the grooves 56 in the lens elements 18 to 21 may be of the same depth and may be parallel to each other. Since the lens elements 18 and 20 will turn at a speed different from the rotational speed of the lens elements 19 and 21, it will be clear that the grooves of the lens elements on the same shaft will constantly vary in relationship to each other. One such relation is shown in Figures 4 and 5. It will be understood that the prismatic conformations on the back of the lens members 18 to 21 may be varied in shape to produce the desired bending of the light beam, the preferred embodiment being the one shown in Figure 4 and Figure 6. In the modified form shown in Figure 9, lens 18a corresponds to lens 19 of Figure 4. The lens members 18a and 19a each have a grooved back face, approximately half the grooves of each being cut at an angle at approximately 20° and the remaining grooves are cut at an angle of approximately 10°. The formation of the grooves of lens elements 18a and 19a produces, upon rotation of the elements in the path of a light beam, a pattern which may be described as a "double spiral." The effect on a surface struck by the light or upon an observer is such that a single beam of light describes a quarter-arc of a widening spiral, whereupon the single beam becomes two beams, the two beams describing the next quarter-arc, whereupon the two beams merge into a single beam again which then describes a third quarter-arc at which point the beam again becomes two beams which then describe a fourth quarter arc, whereupon the pattern is repeated.

It will be realized that, whereas, we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing. For example, the two lens elements of one cooperating pair may each be made slightly smaller in diameter than its corresponding element of the other pair when it is desired to insure that at no time shall the spiral pattern produced by one pair of lens elements become synchronized with the spiral pattern produced by the other pair.

The use and operation of our device is as follows:

We provide a simple space-saving mechanism for imparting motion to a plurality of light beams emanating from the single housing, that permits the installation of a plurality of light sources projecting a steady light beam from the same housing. A single and simple power source is provided to turn a plurality of lenses set before a plurality of light sources. Upon initial installation as shown in the accompanying drawings the roller 8—9 will turn the lens elements 18 to 21 all in the same direction while turning the lens elements 18 and 20 at a speed slower than the rotational speed of the lens elements 19 and 21. As the roller 8—9 wears smaller, it will drop deeper into the area between the sets of lens elements. When the roller 8—9 has dropped to a prohibitive point, for example such as the point at which the enlarged segment 9 will contact the back face of the lens elements 18 and 20, a mechanic can adjust the hinge portion 27 to level the shaft 10 once more. When it is desired to use heat-effected material as the material of the lens elements 18 to 21, we provide a method for preventing deformation of the lens elements due to the heat emanating from the light sources, which includes the impellor 11 on the shaft 10. It will be understood that if materials unaffected by such heat, such as certain plastics, are used in the lens elements the impellor 11 may be unnecessary. When an emergency vehicle, or a locomotive is not moving it is not possible for an observer approaching the vehicle toward the light source on the vehicle to discern that fact. For example, the operating personnel of an onrushing train cannot tell whether or not the light toward which they are approaching is emanating from a stationary or moving train. If, for example, the second train has met with disaster and the cars thereof are strewn across the adjacent tracks, the operating personnel of an onrushing train could not determine that fact until it is too late. We provide a method for clearly and unmistakably informing such operating personnel and any observer that the vehicle upon which our light structure is mounted is not moving and should be approached with caution. Our method includes a solenoid or pneumatic cylinder which is activated automatically upon the stopping of the vehicle, by any known activation method the details of which are not shown and do not form a part of this invention. When the piston 44 and the attached rod 75 move, the crank-arms 78 are moved to a generally upwardly inclined position and the shutters 3a, 3b, 3c, 3d, 3e and 3f are turned to an overlapping relationship thereby closing off the front face of the housing 1 to the emanation of white light while permitting the emanation of red light from said housing. It will be clear that the light beams, both stationary and moving will continue to operate after the shutters have closed, but the observer will be met with red rays of light, the standard signal for caution.

It is a feature of our invention that we provide a method of imparting motion to light beams while permitting the light source to remain fixed. It is clear that as the grooves in the back faces of the lens element change in relation to each other they cause a change in direction of the light beam emanating from the light source. It will be clear that the shape and direction of the beam emanating from the light sources 6 and 7 will be changed whenever the grooves 56 are changed in shape. In the preferred embodiment of the invention shown in the drawings we provide a series of identical grooves on the back of each lens, the grooves of one lens being identical with the grooves of each other lens. We find that this provides a very desirable action in our moving beams of light which may be described as a spiral action. The beam of light emanating from the light source 6 and that emanating from the light source 7 will describe on the area ahead a constant spiral in which the beam will spiral from a point directly ahead of the center of the light source in an outwardly expanding spiral until it has illuminated a wide periphery extending to either side of the direct path ahead at which point the light beam will return to the center of the spiral and the action is repeated. It will be clear that the speed of motion of the light beam and the frequency of complete cycles from center to center of each ensuing spiral is determined by the speed of the motor 24 which may be set in any known manner at a desired rate. It will be clear that in those installations in which a changing color is desired in a moving light, this may be easily provided by merely providing the colors desired at different portions of the lens elements 18 to 21, which will cause the ray of light to change color as it describes its path created by the particular configuration given to the grooves in the lens.

In the structure as shown we provide means for causing a light source to emit a moving beam, which beam moves in a spiral path, considering the movement of the beam in a predetermined plane intersecting the beam. In Figure 10 we illustrate an example of the spiraling which can be obtained with the structure herein shown, in which a lens or lenses are rotated in the path of delivery of the beam from the fixed light source. It will be understood, however, that any structure in which relative movement of the light source and lens causes the emission of a spirally moving beam is within the scope of our invention. Whereas, for convenience, we have illustrated a fixed light source and a rotated lens, it will be understood that we may employ a fixed lens and a moving light source, or a lens and a light source which move differentially.

We claim:

1. In a light assembly, a housing having an opening therein, a light source in said housing adapted to direct a beam of light along an axis extending outwardly through and beyond the opening, a light beam deflecting structure for moving said light beam beyond the opening, said light beam deflecting structure including a plurality of rotatable deflectors positioned generally along said axis and a drive mechanism for rotating said rotatable deflectors at different speeds to repetitively move said light beam away from said axis and return the beam to said axis while rotating the light beam.

2. In a light assembly, a housing having an opening therein, a light source in said housing adapted to direct a beam of light along an axis extending outwardly through and beyond the opening, a first light beam deflector positioned in the path of said light beam to deflect said light beam outwardly from said axis, means for rotating said first deflector to rotate said deflected light beam, a second light beam deflector positioned along said axis and in the path of said deflected light beam, and means for rotating said second deflector at a different speed to move said deflected light beam continuously toward and away from said axis beyond said opening.

3. In a light structure, lens members mounted for rotation in the path of the light beams emanating from two adjacent light sources, said two light sources lying substantially in a horizontal plane, a motor having a shaft lying in a vertical plane between said lens members and having a substantially circular portion in rolling contact with said members, said portion being larger in diameter than the space between the closest edge portions of said lens members, said motor being pivotally mounted at its end opposite to that nearest said lens members, the weight of said motor and shaft being effective to maintain said rolling contact upon wearing of said circular portion.

4. In a light structure, a light source, and a normally fixed reflector therefor, a plurality of lens members generally concentrically mounted for rotation in the path of the light beam emanating from said source about the axis of said fixed reflector, identical prismatic conformations on each of said lens members and unitary means for rotating one of said lens members at one speed and for rotating another of said lens members at another speed comprising a motor and a motor shaft, and a roller on said shaft in rolling contact with said lens members.

5. In a light structure, a light source, and a normally fixed reflector therefor, a plurality of lens members generally concentrically mounted for rotation in the path of the light beam emanating from said source about the axis of said fixed reflector, identical prismatic conformations on each of said lens members and unitary means for rotating one of said lens membrs at one speed and for rotating another of said lens members at another speed, including a motor and a motor shaft, a roller on said shaft in rolling contact with said lens members, one of said lens members being of one area and another being of a greater area, and an enlarged portion on said roller adapted to rotate one of said lens members, said roller being adapted to rotate another of said lens members.

6. In a light assembly adapted to emit a spirally moving beam, a normally fixed reflective light source adapted to direct a beam along a generally defined axis, a base on which said light source is positioned, a plurality of light-permeable lenses mounted for rotation in the path of the light beam emanating from said reflective light source along said axis, and means for differentially moving said lens members in predetermined relationship to the optical characteristics of the lens members, to effect a generally spirally moving beam.

7. In a light assembly adapted to emit a spirally moving beam, a normally fixed reflective light source adapted to direct a beam along a generally defined axis, a base on which said light source is positioned, a plurality of lenses mounted for rotation in the path of the light beam emanating from said reflective light source, and means for differentially moving said lens members in predetermined relationship to the optical characteristics of the lens members, to effect a generally spirally moving beam, the diameter of said lenses and the diameter of the light beam to be moved being substantially equal at the plane of intersection of said lenses and said light beam.

(References on following page)

References Cited in the file of this patent

UNITED STATES PATENTS

| | | |
|---|---|---|
| 1,670,682 | Halvorson, Jr. et al. | May 22, 1928 |
| 1,765,073 | Hester et al. | June 17, 1930 |
| 2,159,636 | Robert | May 23, 1939 |
| 2,219,018 | Parsberg | Oct. 22, 1940 |
| 2,262,239 | Kennelly | Nov. 11, 1941 |
| 2,272,947 | Hotchner | Feb. 10, 1942 |
| 2,342,202 | Kennelly | Feb. 22, 1944 |
| 2,442,569 | Kennelly | June 1, 1948 |
| 2,446,333 | Kennelly | Aug. 3, 1948 |
| 2,464,318 | Kennelly | Mar. 15, 1949 |
| 2,475,365 | Walsh | July 5, 1949 |
| 2,495,296 | Springer | Jan. 24, 1950 |
| 2,510,892 | Kennelly | June 6, 1950 |
| 2,607,838 | McDowell | Aug. 19, 1952 |
| 2,607,839 | Heehler | Aug. 19, 1952 |

OTHER REFERENCES

Pyle: National Bulletin No. 5115 of February 15, 1949, "Gyralites" (page 10 used).